(12) United States Patent
Niyogi et al.

(10) Patent No.: US 7,428,725 B2
(45) Date of Patent: Sep. 23, 2008

(54) INSERTING DEVICES SPECIFIC CONTENT

(75) Inventors: Shanku S. Niyogi, Bellevue, WA (US); Greg D. Schechter, Seattle, WA (US); Regis L. F. Brid, Bothell, WA (US); David J. Kurlander, Seattle, WA (US); Daniel R. Lehenbauer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 603 days.

(21) Appl. No.: 09/989,562

(22) Filed: Nov. 20, 2001

(65) Prior Publication Data

US 2003/0097639 A1    May 22, 2003

(51) Int. Cl.
G06F 9/44 (2006.01)
G06F 9/45 (2006.01)
G06F 3/00 (2006.01)
G06F 3/048 (2006.01)

(52) U.S. Cl. .............. 717/109; 717/107; 717/108; 717/121; 717/140; 715/744; 715/765

(58) Field of Classification Search ......... 717/168–178, 717/104–146; 709/202–219; 345/961–963
See application file for complete search history.

(56) References Cited

U.S. PATENT DOCUMENTS

| | | | |
|---|---|---|---|
| 3,937,925 A | 2/1976 | Boothroyd | |
| 3,956,615 A | 5/1976 | Anderson et al. | |
| 4,186,871 A | 2/1980 | Anderson et al. | |
| 4,807,154 A | 2/1989 | Scully et al. | |
| 4,847,785 A | 7/1989 | Stephens | |
| 4,949,300 A | 8/1990 | Christenson et al. | |
| 4,979,148 A | 12/1990 | Bush et al. | |
| 5,093,778 A | 3/1992 | Favor et al. | |
| 5,299,315 A | 3/1994 | Chin et al. | |
| 5,349,657 A | 9/1994 | Lee | |
| 5,388,156 A | 2/1995 | Blackledge, Jr. et al. | |
| 5,434,992 A | 7/1995 | Mattson | |
| 5,465,332 A | 11/1995 | Deloye et al. | |
| 5,471,318 A | 11/1995 | Ahuja et al. | |
| 5,517,655 A | 5/1996 | Collins et al. | |
| 5,548,340 A | 8/1996 | Bertram | |
| 5,550,560 A | 8/1996 | Kanada et al. | |

(Continued)

FOREIGN PATENT DOCUMENTS

EP    01 11 1679    12/2000

(Continued)

OTHER PUBLICATIONS

European Search Report 01111678.7-2201.

(Continued)

*Primary Examiner*—Chuck O Kendall
(74) *Attorney, Agent, or Firm*—Merchant & Gould P.C.

(57) ABSTRACT

A server-based application includes at least one page file that identifies one or more server objects. The page file describes the particular layout and interaction of the server objects, such as controls, in such a way that a page of information may be transmitted to a target device. When designing the page file a developer may use declarative statement, so that certain properties of the specified controls may be altered based on the particular type of target device.

25 Claims, 5 Drawing Sheets

U.S. PATENT DOCUMENTS

| | | | |
|---|---|---|---|
| 5,604,908 A | 2/1997 | Mortson | |
| 5,608,890 A | 3/1997 | Berger et al. | |
| 5,638,176 A | 6/1997 | Hobbs et al. | |
| 5,640,449 A | 6/1997 | Worley et al. | |
| 5,649,131 A | 7/1997 | Ackerman et al. | 715/744 |
| 5,664,228 A | 9/1997 | Mital | |
| 5,675,520 A | 10/1997 | Pitt, III et al. | |
| 5,706,505 A | 1/1998 | Fraley et al. | |
| 5,727,159 A | 3/1998 | Kikinis | |
| 5,732,256 A | 3/1998 | Smith | |
| 5,732,267 A | 3/1998 | Smith | |
| 5,745,103 A | 4/1998 | Smith | |
| 5,748,890 A | 5/1998 | Goldberg et al. | |
| 5,754,774 A | 5/1998 | Bittinger et al. | |
| 5,764,235 A | 6/1998 | Hunt et al. | 345/428 |
| 5,764,236 A | 6/1998 | Tanaka | |
| 5,764,873 A | 6/1998 | Magid et al. | |
| 5,774,670 A | 6/1998 | Montulli | |
| 5,793,982 A | 8/1998 | Shrader et al. | |
| 5,802,600 A | 9/1998 | Smith et al. | |
| 5,812,996 A | 9/1998 | Rubin et al. | |
| 5,835,724 A | 11/1998 | Smith | |
| 5,855,020 A | 12/1998 | Kirsch | |
| 5,878,141 A | 3/1999 | Daly et al. | |
| 5,878,282 A | 3/1999 | Mital | |
| 5,892,937 A | 4/1999 | Caccavale | |
| 5,897,622 A | 4/1999 | Blinn | |
| 5,897,644 A | 4/1999 | Nielsen | |
| 5,911,068 A | 6/1999 | Zimmerman et al. | |
| 5,911,145 A | 6/1999 | Arora et al. | |
| 5,918,007 A | 6/1999 | Blackledge, Jr. et al. | |
| 5,935,207 A | 8/1999 | Logue et al. | |
| 5,940,075 A | 8/1999 | Mutschler, III | |
| 5,940,847 A | 8/1999 | Fein et al. | |
| 5,953,524 A | 9/1999 | Meng et al. | |
| 5,956,489 A | 9/1999 | San Andres et al. | |
| 5,961,601 A | 10/1999 | Iyengar | |
| 5,963,952 A | 10/1999 | Smith | |
| 5,974,430 A | 10/1999 | Mutschler, III et al. | |
| 5,983,227 A | 11/1999 | Nazem et al. | |
| 5,991,802 A | 11/1999 | Allard et al. | |
| 5,995,753 A | 11/1999 | Walker | 717/108 |
| 6,006,230 A | 12/1999 | Ludwug et al. | |
| 6,014,637 A | 1/2000 | Fell et al. | |
| 6,014,666 A | 1/2000 | Helland et al. | |
| 6,023,714 A | 2/2000 | Hill et al. | |
| 6,032,207 A | 2/2000 | Wilson | |
| 6,038,551 A | 3/2000 | Barlow et al. | |
| 6,067,578 A | 5/2000 | Zimmerman et al. | |
| 6,072,664 A | 6/2000 | Aoyagi et al. | |
| 6,076,108 A | 6/2000 | Courts et al. | |
| 6,101,607 A | 8/2000 | Bachand et al. | |
| 6,108,717 A | 8/2000 | Kimura | |
| 6,115,744 A | 9/2000 | Robins | |
| 6,119,078 A | 9/2000 | Kobayakawa et al. | |
| 6,119,115 A | 9/2000 | Barr | |
| 6,119,155 A * | 9/2000 | Rossmann et al. | 709/219 |
| 6,121,968 A | 9/2000 | Arcuri et al. | |
| 6,122,637 A | 9/2000 | Yohe et al. | |
| 6,128,623 A | 10/2000 | Mattis et al. | |
| 6,138,150 A | 10/2000 | Nichols et al. | |
| 6,138,171 A | 10/2000 | Walker | 719/318 |
| 6,151,624 A | 11/2000 | Teare et al. | |
| 6,167,438 A | 12/2000 | Yates et al. | |
| 6,167,441 A * | 12/2000 | Himmel | 709/217 |
| 6,167,524 A | 12/2000 | Goodnow et al. | |
| 6,173,316 B1 | 1/2001 | DeBoor et al. | 709/218 |
| 6,178,461 B1 | 1/2001 | Chan | |
| 6,185,608 B1 | 2/2001 | Hon et al. | |
| 6,185,625 B1 | 2/2001 | Tso et al. | |
| 6,202,199 B1 | 3/2001 | Wydogny et al. | |
| 6,203,220 B1 | 3/2001 | Takenoshita et al. | |
| 6,205,480 B1 | 3/2001 | Broadhurst et al. | |
| 6,212,192 B1 | 4/2001 | Mirashrafi et al. | |
| 6,218,958 B1 | 4/2001 | Eichstaedt et al. | |
| 6,230,160 B1 | 5/2001 | Chan | |
| 6,230,313 B1 | 5/2001 | Callahan et al. | |
| 6,246,422 B1 | 6/2001 | Emberling et al. | |
| 6,247,044 B1 | 6/2001 | Gosling et al. | |
| 6,249,844 B1 | 6/2001 | Schloss et al. | |
| 6,253,228 B1 | 6/2001 | Ferris et al. | |
| 6,253,234 B1 | 6/2001 | Hunt et al. | |
| 6,279,151 B1 | 8/2001 | Breslau et al. | |
| 6,286,133 B1 | 9/2001 | Hopkins | |
| 6,297,819 B1 | 10/2001 | Furst | |
| 6,300,947 B1 | 10/2001 | Kanevsky | |
| 6,311,215 B1 | 10/2001 | Bakshi et al. | |
| 6,326,957 B1 | 12/2001 | Nathan et al. | |
| 6,334,126 B1 | 12/2001 | Nagatomo et al. | |
| 6,334,157 B1 | 12/2001 | Oppermann et al. | |
| 6,343,148 B2 | 1/2002 | Nagy | |
| 6,345,279 B1 | 2/2002 | Li et al. | |
| 6,351,767 B1 | 2/2002 | Batchelder et al. | |
| 6,353,447 B1 | 3/2002 | Truluck et al. | |
| 6,354,477 B1 | 3/2002 | Trummer | |
| 6,363,352 B1 | 3/2002 | Dailey et al. | |
| 6,370,561 B1 | 4/2002 | Allard et al. | |
| 6,373,841 B1 | 4/2002 | Goh et al. | |
| 6,384,846 B1 | 5/2002 | Hiroi | |
| 6,397,253 B1 | 5/2002 | Quinlan et al. | |
| 6,401,099 B1 | 6/2002 | Koppulu et al. | |
| 6,401,132 B1 | 6/2002 | Bellwood et al. | 709/246 |
| 6,405,241 B2 | 6/2002 | Gosling | |
| 6,412,008 B1 | 6/2002 | Fields et al. | 709/228 |
| 6,421,717 B1 | 7/2002 | Kloba et al. | |
| 6,421,733 B1 | 7/2002 | Tso et al. | |
| 6,424,981 B1 | 7/2002 | Isaac et al. | |
| 6,426,761 B1 | 7/2002 | Kanevsky et al. | |
| 6,430,575 B1 | 8/2002 | Dourish et al. | |
| 6,438,576 B1 * | 8/2002 | Huang et al. | 709/202 |
| 6,457,030 B1 | 9/2002 | Adams et al. | |
| 6,460,071 B1 | 10/2002 | Hoffman | |
| 6,460,141 B1 | 10/2002 | Olden | |
| 6,463,442 B1 | 10/2002 | Bent et al. | |
| 6,466,203 B2 | 10/2002 | Van Ee | |
| 6,470,381 B2 | 10/2002 | DeBoor et al. | 709/217 |
| 6,473,609 B1 * | 10/2002 | Schwartz et al. | 455/406 |
| 6,480,894 B1 | 11/2002 | Courts et al. | |
| 6,487,665 B1 | 11/2002 | Andrews et al. | |
| 6,496,692 B1 | 12/2002 | Shanahan | |
| 6,505,238 B1 | 1/2003 | Tran | |
| 6,509,913 B2 | 1/2003 | Martin et al. | 715/762 |
| 6,514,408 B1 | 2/2003 | Smith et al. | |
| 6,535,896 B2 | 3/2003 | Britton et al. | 715/523 |
| 6,539,421 B1 | 3/2003 | Appelman et al. | |
| 6,539,501 B1 | 3/2003 | Edwards | |
| 6,542,908 B1 | 4/2003 | Ims | |
| 6,542,967 B1 | 4/2003 | Major | |
| 6,546,473 B2 | 4/2003 | Cherkasova et al. | |
| 6,546,516 B1 | 4/2003 | Wright et al. | |
| 6,556,217 B1 | 4/2003 | Makipaa et al. | 345/667 |
| 6,557,038 B1 | 4/2003 | Becker et al. | |
| 6,560,598 B2 | 5/2003 | Delo et al. | |
| 6,560,618 B1 | 5/2003 | Ims | |
| 6,560,639 B1 | 5/2003 | Dan et al. | |
| 6,563,517 B1 | 5/2003 | Bhagwat et al. | |
| 6,563,913 B1 | 5/2003 | Kaghazian | |
| 6,564,251 B2 | 5/2003 | Katariya et al. | |
| 6,591,272 B1 | 7/2003 | Williams | |
| 6,593,944 B1 | 7/2003 | Nicolas et al. | |
| 6,606,418 B2 | 8/2003 | Mitchell et al. | |
| 6,610,105 B1 | 8/2003 | Martin et al. | 715/513 |
| 6,622,168 B1 | 9/2003 | Datta | |
| 6,633,416 B1 | 10/2003 | Benson | |

| | | | | | | |
|---|---|---|---|---|---|---|
| 6,643,712 B1 | 11/2003 | Shaw et al. | | 2002/0120753 A1 | 8/2002 | Levanon et al. ............. 709/228 |
| 6,678,518 B2 | 1/2004 | Eerola | | 2002/0129016 A1 | 9/2002 | Chrisfort et al. |
| 6,687,735 B1 | 2/2004 | Logston et al. | | 2002/0133635 A1 | 9/2002 | Schechter et al. |
| 6,697,825 B1 | 2/2004 | Underwood et al. | | 2002/0138331 A1 | 9/2002 | Hosea et al. |
| 6,704,024 B2* | 3/2004 | Robotham et al. .......... 345/581 | | 2002/0152244 A1* | 10/2002 | Dean et al. |
| 6,704,728 B1 | 3/2004 | Chang et al. .................... 707/5 | | 2002/0161928 A1 | 10/2002 | Ndili .......................... 709/246 |
| 6,714,794 B1 | 3/2004 | O'Carroll .................... 455/466 | | 2002/0161938 A1 | 10/2002 | Ndili |
| 6,725,219 B2 | 4/2004 | Nelson et al. | | 2002/0188890 A1 | 12/2002 | Shupps et al. |
| 6,728,421 B2 | 4/2004 | Kokemohr | | 2002/0194227 A1 | 12/2002 | Day et al. |
| 6,732,364 B1 | 5/2004 | Bhaskaran et al. | | 2003/0004998 A1 | 1/2003 | Datta |
| 6,757,708 B1 | 6/2004 | Craig et al. | | 2003/0009476 A1 | 1/2003 | Fomenko et al. |
| 6,757,899 B2 | 6/2004 | Zhdankin et al. | | 2003/0009519 A1 | 1/2003 | Gosling et al. |
| 6,757,900 B1 | 6/2004 | Burd et al. | | 2003/0009567 A1 | 1/2003 | Farouk |
| 6,772,408 B1 | 8/2004 | Velonis et al. | | 2003/0018827 A1 | 1/2003 | Guthrie et al. |
| 6,782,403 B1 | 8/2004 | Kino et al. | | 2003/0025728 A1 | 2/2003 | Ebbo et al. |
| 6,789,105 B2 | 9/2004 | Ludwig et al. | | 2003/0028565 A1 | 2/2003 | Landsman et al. |
| 6,792,575 B1 | 9/2004 | Samaniego et al. ......... 715/513 | | 2003/0028892 A1 | 2/2003 | Gewickey et al. |
| 6,792,605 B1 | 9/2004 | Roberts et al. | | 2003/0066056 A1 | 4/2003 | Petersen et al. |
| 6,792,607 B1 | 9/2004 | Burd et al. | | 2003/0074634 A1 | 4/2003 | Emmelmann |
| 6,826,597 B1 | 11/2004 | Lonnroth et al. ............. 709/207 | | 2003/0097639 A1 | 5/2003 | Niyogi et al. |
| 6,832,263 B2 | 12/2004 | Polizzi et al. | | 2003/0110234 A1* | 6/2003 | Egli et al. |
| 6,847,333 B2 | 1/2005 | Bokhour ..................... 345/1.1 | | 2003/0187952 A1 | 10/2003 | Young et al. ................. 709/219 |
| 6,886,013 B1 | 4/2005 | Beranek ....................... 707/10 | | 2003/0204622 A1 | 10/2003 | Blizniak et al. |
| 6,892,226 B1 | 5/2005 | Tso et al. | | 2003/0233477 A1 | 12/2003 | Ballinger et al. |
| 6,901,437 B1 | 5/2005 | Li .............................. 709/219 | | 2004/0003112 A1 | 1/2004 | Alles et al. |
| 6,904,600 B1 | 6/2005 | James et al. | | 2004/0003117 A1 | 1/2004 | McCoy et al. |
| 6,915,307 B1 | 7/2005 | Mattis et al. | | 2004/0003139 A1 | 1/2004 | Cottrille et al. |
| 6,915,454 B1 | 7/2005 | Moore et al. | | 2004/0003248 A1 | 1/2004 | Arkhipov |
| 6,918,107 B2 | 7/2005 | Lucas et al. | | 2004/0012627 A1 | 1/2004 | Zakharia et al. |
| 6,920,480 B2 | 7/2005 | Mitchell et al. | | 2004/0015879 A1 | 1/2004 | Pauw et al. |
| 6,922,827 B2 | 7/2005 | Vasilik et al. | | 2004/0030740 A1 | 2/2004 | Stelting |
| 6,928,488 B1 | 8/2005 | de Jong et al. | | 2004/0073873 A1 | 4/2004 | Croney et al. |
| 6,944,797 B1 | 9/2005 | Guthrie et al. | | 2004/0172484 A1 | 9/2004 | Hafsteinsson et al. |
| 6,948,174 B2 | 9/2005 | Chiang et al. | | 2004/0218045 A1 | 11/2004 | Bodnar et al. |
| 6,950,875 B1 | 9/2005 | Slaughter et al. | | 2004/0230958 A1 | 11/2004 | Alaluf |
| 6,954,751 B2 | 10/2005 | Christfort et al. | | 2005/0091230 A1 | 4/2005 | Ebbo et al. |
| 6,954,854 B1 | 10/2005 | Miura et al. | | 2005/0138560 A1 | 6/2005 | Lee et al. |
| 6,961,750 B1* | 11/2005 | Burd et al. .................. 709/203 | | 2005/0171967 A1 | 8/2005 | Yuknewicz |
| 6,961,754 B2 | 11/2005 | Christopoulos et al. ..... 709/204 | | 2005/0193097 A1 | 9/2005 | Guthrie et al. |
| 6,961,776 B1 | 11/2005 | Buckingham et al. ........ 709/229 | | 2005/0229186 A1 | 10/2005 | Mitchell et al. |
| 6,964,009 B2 | 11/2005 | Samaniego et al. ....... 715/501.1 | | 2005/0251380 A1 | 11/2005 | Calvert et al. |
| 6,990,653 B1* | 1/2006 | Burd et al. .................. 717/108 | | 2005/0256834 A1 | 11/2005 | Millington et al. |
| 7,013,340 B1 | 3/2006 | Burd et al. | | 2005/0256924 A1 | 11/2005 | Chory et al. |
| 7,016,963 B1 | 3/2006 | Judd et al. | | 2005/0256933 A1 | 11/2005 | Millington et al. |
| 7,076,786 B2 | 7/2006 | Burd et al. | | 2005/0257138 A1 | 11/2005 | Chory et al. |
| 7,099,870 B2 | 8/2006 | Hsu et al. | | 2005/0268292 A1 | 12/2005 | Ebbo et al. |
| 7,117,504 B2 | 10/2006 | Smith et al. | | 2005/0278351 A1 | 12/2005 | Niyogi et al. |
| 7,159,007 B2 | 1/2007 | Stawikoski | | 2006/0004910 A1 | 1/2006 | Burd et al. |
| 7,162,723 B2 | 1/2007 | Guthrie et al. | | 2006/0020883 A1 | 1/2006 | Kothari et al. |
| 7,171,443 B2 | 1/2007 | Tiemann et al. | | 2006/0112336 A1 | 5/2006 | Gewickey et al. |
| 7,171,454 B2 | 1/2007 | Nguyen | | 2006/0130038 A1 | 6/2006 | Claussen et al. |
| 7,181,731 B2 | 2/2007 | Pace et al. | | 2007/0005795 A1 | 1/2007 | Gonzalez |
| 7,188,112 B1 | 3/2007 | Lindquist et al. | | 2007/0033533 A1 | 2/2007 | Sull |
| 7,188,155 B2 | 3/2007 | Flurry et al. | | 2007/0174845 A1 | 7/2007 | Guthrie et al. |
| 7,216,294 B2 | 5/2007 | Gibbs et al. | | | | |
| 2001/0013070 A1 | 8/2001 | Sasaki | | | | |
| 2001/0027474 A1* | 10/2001 | Nachman et al. | | FOREIGN PATENT DOCUMENTS | | |
| 2001/0037404 A1 | 11/2001 | Hafsteinsson et al. ....... 709/203 | | EP | 01111679 A2 | 12/2000 |
| 2001/0047385 A1 | 11/2001 | Tuatini | | EP | 1156415 | 11/2001 |
| 2001/0054020 A1 | 12/2001 | Barth et al. | | EP | 1156415 A2 * | 11/2001 |
| 2002/0004815 A1 | 1/2002 | Muhlestein et al. | | EP | 1156427 | 11/2001 |
| 2002/0008703 A1 | 1/2002 | Merrill et al. | | EP | 1156428 | 11/2001 |
| 2002/0056085 A1 | 5/2002 | Fahraeus ........................ 725/1 | | EP | 1156429 | 11/2001 |
| 2002/0062396 A1 | 5/2002 | Kakei et al. | | EP | 1164473 | 12/2001 |
| 2002/0073163 A1 | 6/2002 | Churchill et al. | | EP | 1241593 | 3/2002 |
| 2002/0078101 A1 | 6/2002 | Chang et al. ................. 707/523 | | EP | 01111680.3-2201 | 4/2002 |
| 2002/0078144 A1 | 6/2002 | Lamkin et al. ............. 709/203 | | EP | 01111681.1-2201 | 4/2002 |
| 2002/0083171 A1 | 6/2002 | Hoogenboom et al. | | GB | 2339374 A | 1/2000 |
| 2002/0095445 A1 | 7/2002 | alSafadi et al. ............. 707/517 | | JP | 11-98134 | 4/1999 |
| 2002/0107891 A1 | 8/2002 | Leamon et al. | | JP | 2002-24079 | 1/2002 |
| 2002/0108102 A1 | 8/2002 | Muhlestein et al. | | JP | 2002-41299 | 2/2002 |
| 2002/0116534 A1 | 8/2002 | Teeple ........................ 709/246 | | JP | 2002-49484 | 2/2002 |
| 2002/0120677 A1 | 8/2002 | Goward et al. | | JP | 2002-49585 | 2/2002 |

| | | |
|---|---|---|
| WO | WO 98/21651 | 5/1998 |
| WO | WO 98/44695 | 10/1998 |
| WO | WO 99/34288 | 7/1999 |
| WO | WO 99/34288 A | 7/1999 |
| WO | WO 01/27783 | 4/2001 |
| WO | WO 01/75667 | 10/2001 |
| WO | WO 02/21343 | 3/2002 |

OTHER PUBLICATIONS

European Search Report 01111680.3-2201.
European Search Report 01111681.1-2201.
European Search Report 01111682.9-2201.
"Alterego Networks Introduces First Mobile Web Server for Enterprises, Telcos and Providers"; Redwood City, CA; Nov. 14, 2000; 3 pages.
Anderson, Richard; Homer, Alex; Howard, Rob; Sussman, Dave; "A Preview of Active Server Pages+"; Copyright 2000, Wrox Press, pp. 1-73.
Developing ASP-Based Applications: Microsoft 1996, 5 pages.
"Bluestone Software Layes Foundation for Internet Operating Environment with Total-E-Server. . ." Screaming Media, Business Wire; Jun. 5, 2000; 3 pages.
Chapter 3, "Mechanics of Developing JavaScript Application"; Server-Side Javascript Guide; Online! 1999; pp. 51-108 www.developer.netscape.com/docs/mauals/ssjs/1_4/ssjs.pdf.
Chapter 6, "Session Mangement Service"; Server Side Javascript Guide; Online! 1999 pp. 125-166 www.developer.netscape.com/docs/manuals/ssjs/1_4/ssjs.pdf.
"ColdFusion: Web Applications Server"; Allair Corp; www.allair.com; 1995-1999; 28 pages.
Custer, Helen; "Inside Windows NT"; Microsoft Press 1993; pp. 74-81.
Davulcu, Hasan; Freire, Juliana; Kifer, Michael; Ramakrishnan, I.V.; "A Layered Architecture for Querying Dynamic Web Content"; ACM 1999; pp. 491-502.
Dobson, Rick; "Data Binding in Dynamic HTML"; DBMS Mar. 1998 pp. 47-52.
Duan, Nick N.; "Distributed Database Access in a Cororate Environment Using Java" Bell Atlantic Corporation; 1996; 8 pages.
Esposito, Dino; "Heaven Sent"; Developer Network Journal issue 23 Mar./Apr. 2001 pp. 18-24.
Franklin, Keith; "Supercharge Data Binding"; Visual Basic Programmer's Journal, Mar. 2000; 7 pages.
Frost, Jim; "Windows NT Security"; May 4, 1995; 7 pages; http://world.std.com/~jimf/papers/nt-security/nt-security.html.
"Hammock: Thick of it as Swing fo the Web"; Jul. 14, 2000; 10 pages.
Hammond, Eric "Hammock Swings through Web interfaces" www.infoworld.com/articles/mt/xml/00/07/000717mthammock.xml; Jul. 14, 2000; 3 pages.
Holmes, John W.; e-Mail response to question regarding GET/POST. HTTP request, extracted from Google's News groups, php.general, Nov. 11, 2002.
Hovanes, Michael E.; Deal, John R. Grizz; Rowberg, Alan H.; "Seamless Multiresolution Display of Portable Wavelet-Compressed Images" Journal of Digital Imaging, vol. 12, No. 2, suppl 1 (May), 1999, pp. 109-111.
"HTML Encyclopaedia"; http://www.scit.wlv.ac.uk/encyc/form.html; 1995-1998 2 pages.
Ingham; David B; "W3Objects: A Distributed Object-Oriented Web Server" Object-Oriented Web Servers and data Modeling Workshop, Sixth International World Wide Web Conference, Apr. 7, 1997, Santa Clara, CA 4 pages.
Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.
Kunz, T.; El Shentenawy, M.; Gaddah, A.; Hafez, R.; Image Transcoding for Wireless WWW Access: The User Perspective; Multimedia Computing and Netorking 2002, Proceedings of SPIE vol. 467 (2002) pp. 28-33.
Marshall, James; "HTTP made Really Easy: A Practical Guide to Writing Clients and Servers"; Aug. 15, 1997; 14 pages.

"A Brief History of Hypertext" Microsoft Corporation, 1996, 1 page.
Nadamoto, Akiyo; Kondo, Hiroyuki; Tanaka, Katsumi; "WebCarousel: Restructuring Web Search Results for Passive Viewing in Mobile Environments" IEEE 2001 p. 164-165.
"OOP Launches Hammock at JaveOne" http://www.oop.com/pr2000_06_08.jsp?gui=Plain Jun. 8, 2000, 1 page.
Pyarali, Irfan; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.
Penn, Gerald; Hu, Jianying; Luo, Hengbin; McDonald, Ryan; "Flexible Web Document Analysis for Delivery to Narrow-Bandwidth Devices"; IEEE 2001; pp. 1074-1078.
Shapiro, Marc; "Binding Protocol for Distributed Shared Objects" Presented at 14th International Conference on Distrubuted Comp. Sys.; Jun. 21-24, 1994; 17 pages.
Shi, Weisong; Collins, Eli; Karamcheti, Vijay; "Modeling Object Characteristics of Dynamic Web Content"; Proceedings of the IEEE Global Internet Conference, Nov. 2002, 5pgs.
Solomon, David A. "Inside Windows NT, Second Edition"; Microsoft Press 1998; pp. 310-319.
Stewart, Tony; "The Document as Application: Issues and Implications" GCA XML Europe 1999; pp. 575-599.
"Best Practices for Creating Adaptive User Interfaces with the Mobile Internet Toolkit"; Microsoft Corporation, Jan. 2002; 15 pages.
"Best Pratices for the Microsoft Mobile Internet Toolkit Image Control"; Microsift Corporation, Feb. 2002.
Wu, Dapeng; Hou, Yiwci Thomas; Zhang, Ya-Qin; "Scalable Video Transport over Wireless IP Networks"; IEEE 2000; pp. 1185-1191.
"HTML Encyclopaedia"; http://www.scit.wlv.ac.uk/encyc/form.html; 2 pages.
Article, ColdFusion Web Application Server, update and summary, from Allaire Corp—www.@allaire.com.
Dowd, Tyson et al., "Compiling Mercury to the .NET Common Language Runtime," Electronic Notes in Theoretical Computer Sciences 59 No. 1 (Netherlands) (2001), pp. 1-16.
Hannay, Phillip et al., "MSIL For the .NET Framework: The next Battleground?", Virus Bulletin Conference, Sep. 2001, pp. 173-196.
Langheinrich, M., et al., "Unintrusive customization techniques for Web advertising," Computer Networks, vol. 31, No. 11-16. May 17, 1999, pp. 1259-1272.
Lee, C.-H., et al., "Web personalization expert with combining collaborative filtering and association rule mining technique," Expert Systems With Applications, Vol. 21, No. 3, Oct. 2001, pp. 131-137.
Li, W.-S., et al., "PowerBookmarks: a system for personalizable Web information organization, sharing, and management,"Computer Networks, vol. 31, No. 11-16, May 17, 1999, pp. 1375-1389.
Mobasher, B., "A Web personalization Engine Based on User Transaction Clustering," Proc. Of the 9th Annual Workshop on Information Tech. And Systems, Dec. 11, 1999, pp. 179-184.
"NCSA httpd" nttpd@ncsa.uiuc.edu.
O'Leary, M., "Web personalization Does It Your Way," O'Leary Online, vol. 23, No. 2, Mar.-Apr. 1999, pp. 79-80.
Ramakrishnan, N., "PIPE: Web Personalization by Partial Evaluation," IEEE Internet Computing, vol. 4, No. 6, Nov.-Dec. 2000, pp. 21-31.
Seddon, Bill, "Generating XP Style webparts from a web control," The Code Project—Generating XP style webparts from a web control—ASP.NET, online at http://www.codeproject.com/aspnet/webpartscontrol.asp, retrieved Apr. 8, 2004, 10 pages.
Sells, Chris et al., "Generating Code at Run Time with Reflection. Emit," Windows Developer Magazine, Aug. 2002, vol. 13, No. 8, pp. 26-34.
Syme, Don, "ILX: Extending the .NET Common IL for Functional Language Interoperability," Electronic Notes in Theoretical Computer Science 59 No. 1 (2001), pp. 1-20.
Varela, Carlos A.; Caroline C. Hayes; "Providing Data on the Web: From Examples to Programs," Second International WWW Conference, Chicage, IL; Oct. 17, 1994; 17 pages.
"Metadata Activity Statement", Feb. 2001, W3C.
"Metabase Activity Statement," http://web.archive.org/web/20000616163950/http://www.w3.org/Metadata/Activity.html , May 8, 2000, pp. 1-6.

"Spyglass Prism 3.1 Supports the lastest Standards for Transmission on Content to Wireless Devices," Internet citation, Jul. 5, 2000.

"Web Services Description Lanaguage (WSDL)", Mar. 2001, W3C.

Abrams et al., "UIML an applicance-indepentdent XML user inteface language," Computer Networks, Elsevier Science Publishes B.V., Amsterdam, NL, vol. 31, No. 11-16, May 17, 1999, pp. 1695-1708.

Aggarwal, Charu et al., "Caching on the World Wide Web" IEEE Transactions on Knowledge and Data Engineering, vol. 11, No. 1, Jan./Feb. 1999. pp. 94-107.

Alves Dos Santooa, L.M., "Multimedia Data and tools for Web services over Wireless Platforms," IEEE Personal Communications, Oct. 1998, pp. 42-46.

Ballinger, "Fun with SOAP Extensions", Mar. 2001, MSDN, pp. 1-5.

Chapter 1 Introduction—"Java Script Language", Netscape Communications, Apr. 23, 2001.

Ciancarini et al., "An extensible rendering engine for XML and HTNL", Computer Networks and ISDN System, North Holland Publishing, vol. 30, No. 1-7, Apr. 1998, pp. 225-237.

Davidson, et al., "Schema for Object-Oriented IML 2.0", Jul. 1999, W3 Consortium, pp. 1-29.

European Search Report EP 02 00 5786.

Flammia, G., "The Wireles Internet Today and Tomorrow," IEEE Intelligent Systems, [Online ] vol. 15, Sep. 2000, pp. 82-83.

Hannay, Phillip et al., "MSIL For the .NET Framework: The Next Battleground?", Virus Bulletin Conference, Sep. 2001, pp. 173-196.

Heins, et al., "Taking Your Information Into the Wireless World: Developing Information for Delivery to Mobile Devices", IEEE, pp. 237-244, Oct. 2001.

Howard, "Web Services with ASP.NET", Feb. 2001, MSDN, pp. 1-9.

Kaasinen Eija et al.: "Two approaches to bringing internet services to WAP devices," Computer Networks and ISDN Systems, North Holland Publishing, Amsterdam, NL, vol. 33, No. 1, 2000, pp. 231-246.

Kaffe, "Server Side Java", Jan. 16, 2998.

Kagal, et al., "Centaurus: A Framework for Intelligent Services in a Mobile Environment", Computer Science and Electrical Engineering, IEEE, pp. 195-201, Apr. 2001.

Kirda, "Web Engineering Device Independent Web Services", Distributed Systems Group, IEEE, pp. 795-796, May 2001.

Krikelis, A., "Mobile multimedia: shapring the Inforverse", IEEE Concurrency, Jan.-Mar. 1999, pp. 7-9.

Moore, M M, et al. "Migrating legacy user interfaces to the internet: shifting dialogue initiative", IEEE, Nov. 23, 2000, pp. 52-58.

Muller-Wilken S. et al.; "On integrating mobile devices into a workflow management scenario," Database and Expert Systems Applications, 2000. Proceedings 11th International Workshop on Sep. 4-8, 2000, Piscataway, NJ, USA, IEEE, pp. 186-190.

Partial European Search Report for EP 02 00 5786.

Platt, "Thunderclap, the Newsletter of Rolling Thunder Computing", dated to Aug. 2001, vol. 3, No. 2, pp. 1-18.

Ren, Robin, "Practical Active Server Pages Technique: Porting Windows CGI Applications to ASP", Microsoft Interactive Developer, No. 10, pp. 89-98, ASCII Corporation, Nov. 18, 1998 (CSDB: Technical Journal in Japan 2000001200009).

Tuecke, "Microsoft Professional Developers Conference Summary," 1996.

USPTO Advisory Action for U.S. Appl. No. 09/934,122 mailed Mar. 27, 2006.

USPTO Advisory Action for U.S. Appl. No. 09/999,565 mailed Aug. 12, 2005.

USPTO Advisory Action for U.S. Appl. No. 10/269,072 mailed Feb. 8, 2007.

USPTO Advisory Action for U.S. Appl. No. 10/269,072 mailed Mar. 6, 2006.

USPTO Final Rejection for U.S. Appl. No. 09/934,122 mailed Dec. 19, 2005.

USPTO Final Rejection for U.S. Appl. No. 09/999,565 mailed May 25, 2005.

USPTO Final Rejection for U.S. Appl. No. 09/999,565 mailed Jul. 25, 2006.

USPTO Final Rejection for U.S. Appl. No. 10/269,072 mailed Nov. 30, 2006.

USPTO Final Rejection for U.S. Appl. No. 10/269,072 mailed Dec. 4, 2007.

USPTO Final Rejection for U.S. Appl. No. 10/269,072 mailed Dec. 9, 2005.

USPTO Non-Final Rejection for U.S. Appl. No. 09/934,122 mailed Jun. 21, 2005.

USPTO Non-Final Rejection for U.S. Appl. No. 09/934,122 mailed Aug. 9, 2006.

USPTO Non-Final Rejection for U.S. Appl. No. 09/934,122 mailed Dec. 21, 2004.

USPTO Non-Final Rejection for U.S. Appl. No. 09/999,565 mailed Feb. 8, 2006.

USPTO Non-Final Rejection for U.S. Appl. No. 09/999,565 mailed Nov. 17, 2004.

USPTO Non-Final Rejection for U.S. Appl. No. 10/269,072 mailed Apr. 19, 2007.

USPTO Non-Final Rejection for U.S. Appl. No. 10/269,072 mailed Apr. 28, 2005.

USPTO Non-Final Rejection for U.S. Appl. No. 10/269,072 mailed Jun. 14, 2006.

W3C, SOAP Version 1.2 Specification Jul. 9, 2001 Working Draft, Jul. 2001.

Winer, Dave, "XMP RPC Specification", Jun. 15, 1999.

Yoshikawa, Kazuhiro, et al. "Expanding a System via the Internet: Construction/Operation Points to be Considered: Exploring a Construction/Operation for Improving Reliability and Security", Nikkei Open Systems, No. 63, pp. 182-191, Nikkei Business Publication, Inc., Jun. 15, 1998 (CSBD: Technical Journal in Japan 199800933009).

* cited by examiner

INSERTING DEVICES SPECIFIC CONTENT

FIELD OF THE INVENTION

The present invention relates generally to server-hosted application software, and more particularly to altering display properties of objects in a server-hosted application environment.

BACKGROUND OF THE INVENTION

Many Internet-capable devices are available to consumers. Specifically, the number of mobile Internet-capable devices is increasing rapidly. Some Internet-capable devices integrate several functions. For example, a personal digital assistant (PDA), or a cellular telephone may be used for Internet access in addition to other shared functions. A PDA or a cell phone usually has a very different Internet capability than a desktop computer, based upon limitations of screen size, connectivity and system resources. For example, a PDA display may not display very large fonts, pictures, movies, or tables of data or long text strings that would be viewable on a full-size display. It is desirable to accommodate as many devices as possible for Internet content to maximize the benefit of web-based services.

Accompanying the increase in mobile devices accessing the Internet is the number of services that provide active content to the user. For example, a mobile device user-interface (UI), such as an ASP.NET page, may be constructed of a hierarchy of server-side controls. When a page is executed, the objects in the page hierarchy are processed to render the content that is transmitted to the client device. During the rendering process, formatting and layout information specified for the controls is transformed into markup tags interpreted by the client device to produce the desired appearance on the display. When specifying web-application UI for mobile devices, the application author often needs to tailor elements of the UI for different devices or browsers. For example, a label identifying a mail message may be long and descriptive on a device with a larger screen, and short on a device with a smaller screen. Generally, device-specific markup requires the developer to utilize conditional constructs or to use stylesheets or includes. However, since such device customizations are relatively minor, they have high maintainability costs for tasks such as interspersing code or managing multiple files for small visual element differences.

SUMMARY OF THE INVENTION

Briefly stated, a server-based application includes at least one page file that identifies one or more server objects. The page file describes the particular layout and interaction of the server objects, such as controls, in such a way that content may be transmitted to a device requesting the page file. When designing the page file, a developer may use a declarative statement so that certain properties of the specified controls may be altered based on characteristics of the target device.

In an aspect of the invention, a server receives an instruction to transmit content to a target device (e.g., a PDA, cellphone, other mobile device, personal computer, internet-enabled television, or the like). The instruction may be a request generated externally, such as from the device itself, or it may be an instruction generated locally, such as from an application on the server (e.g., time-based content generation software). The content may be a web page, for example. The instruction to transmit the content may include data identifying the target device. A runtime process provides a response to the request for content based upon characteristics of or the type of target device.

In another aspect of the invention, a server contains a page file describing the layout and properties of the content. Controls in the page file define the size, shape and textual properties of the content. A runtime process renders content for a specific target device based upon the page file. When compiled in a runtime process to create a class, the declarative statements in the page file generate code to set control properties for the content based upon the destination device type. Once a page file is compiled for a specific target device, an instance of the compiled class may be instantiated without further compiles for every request from a device of the requesting type. The present invention provides a system and method for inserting device-specific content into a server application for improved runtime device-specific content delivery.

DETAILED DESCRIPTION OF THE INVENTION

The present invention now will be described more fully with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Computer storage media may include volatile and nonvolatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Briefly stated, the present invention is directed towards providing a system and method for optimizing markup in a just-in-time compiling environment for such devices as mobile devices. Among other things, disclosed is a system that employs a declarative construct to provide control overrides for device-specific content rendering. First, an illustrative operating environment and computing server will be described. Next, components used to implement declarative constructs for device-specific content rendering are described. Finally, methods for implementing declarative constructs will be disclosed.

Illustrative Operating Environment

Figure 1:
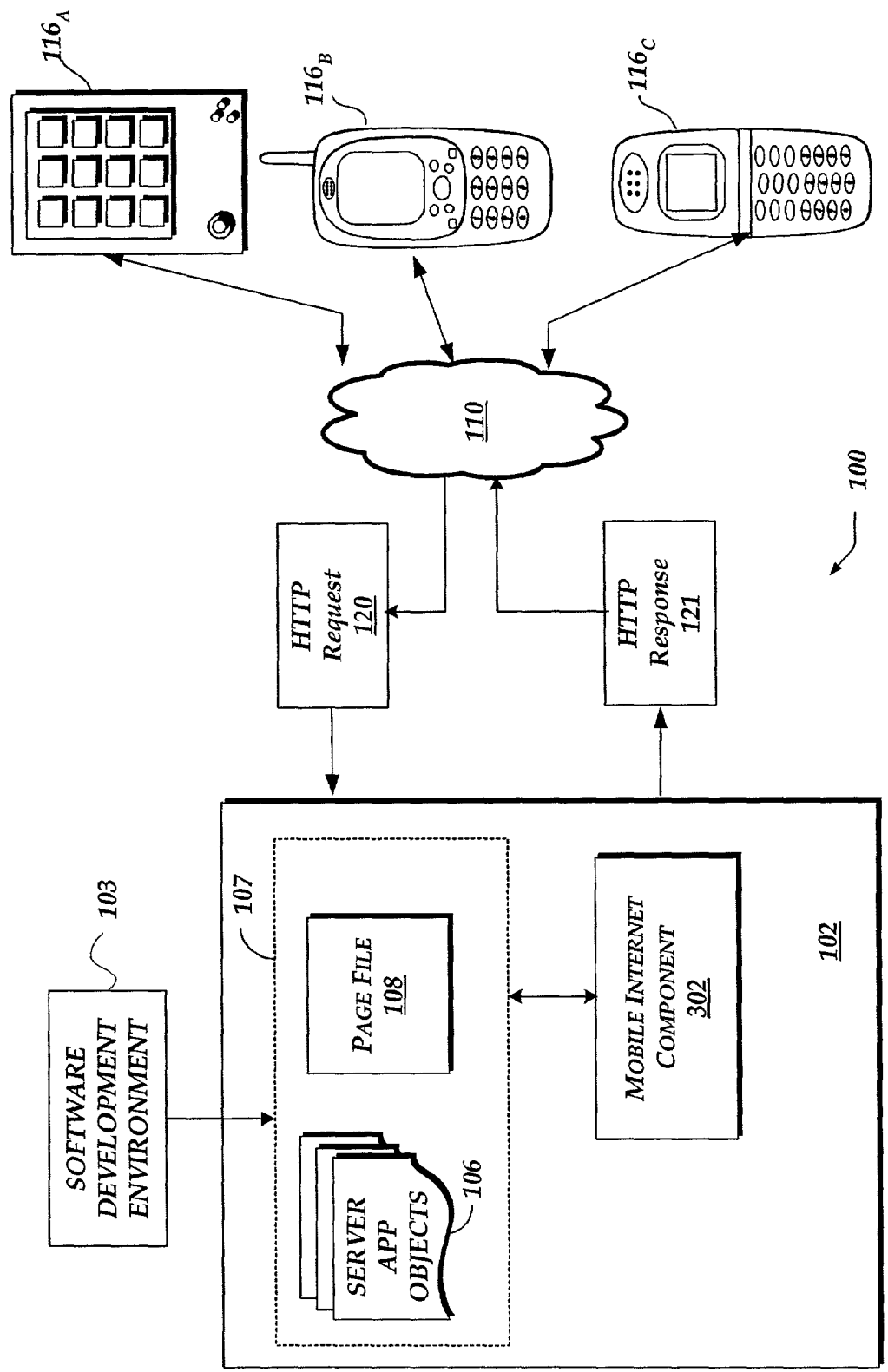
FIG. 1 is a functional block diagram illustrating an exemplary environment for practicing the invention.

FIG. 1 is a functional block diagram illustrating an exemplary environment for practicing the invention. FIG. 1 includes a server 102, a network 110, a software development environment 103 and network capable devices $116_A$, $116_B$ and $116_C$. Server 102 includes server objects 106, mobile Internet component 302, and page file 108.

Mobile devices $116_{A-C}$, are products such as cellular telephones, pagers, hand-held electronic devices, programmable and non-programmable consumer electronics, personal computers, PDAs, and watches, for example. Although described here in the context of mobile devices, it will be appreciated that the teachings of the invention have equal applicability to many other types of target devices, such as personal computers, internet-enabled television sets, and the like. The focus on mobile devices in this disclosure is for simplicity of discussion only.

Mobile devices $116_{A-C}$, may have a variety of capabilities and features. For example, a cell phone may have a numeric keypad and a few lines of monochrome LCD display on which only text may be displayed. A POCKET PC may have a touch sensitive screen, a stylus, and several lines of color LCD display in which both text and graphics may be displayed. A computer may have a keyboard, mouse, speakers, microphone, and a relatively large area on which to display forms.

Network 110 connects mobile Internet component 302 with mobile devices $116_{A-C}$. Communication between mobile Internet component 302 and mobile devices $116_{A-C}$ through network 110 generally includes a request, which happens to be an HTTP request 120 in this instance, and a response, which happens to be an HTTP response 121 in this instance. Generally, the HTTP request 120 includes device identification data that identifies properties of the particular type of target device. For example, if mobile device $116_C$ issues the HTTP request 120, the device identification data may identify mobile device $116_C$ as a WAP-enabled cellular phone. As discussed more fully later, this information may be utilized to provide specific content to the target device. Alternatively, the request 120 may take the form of an instruction generated locally by an application on the server 102 programmed to transmit information to a device without a request having been issued by the device. In one example, an application on the server 102 may be configured to cause content to be delivered to a paging unit periodically without a request issued by the paging unit.

Network 110 may employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices may be remotely connected to either LANs or WANs via a modem and temporary telephone link. In essence, network 110 includes any communication method by which information may travel from any of mobile devices $116_{A-C}$ to server 102.

Figure 2:
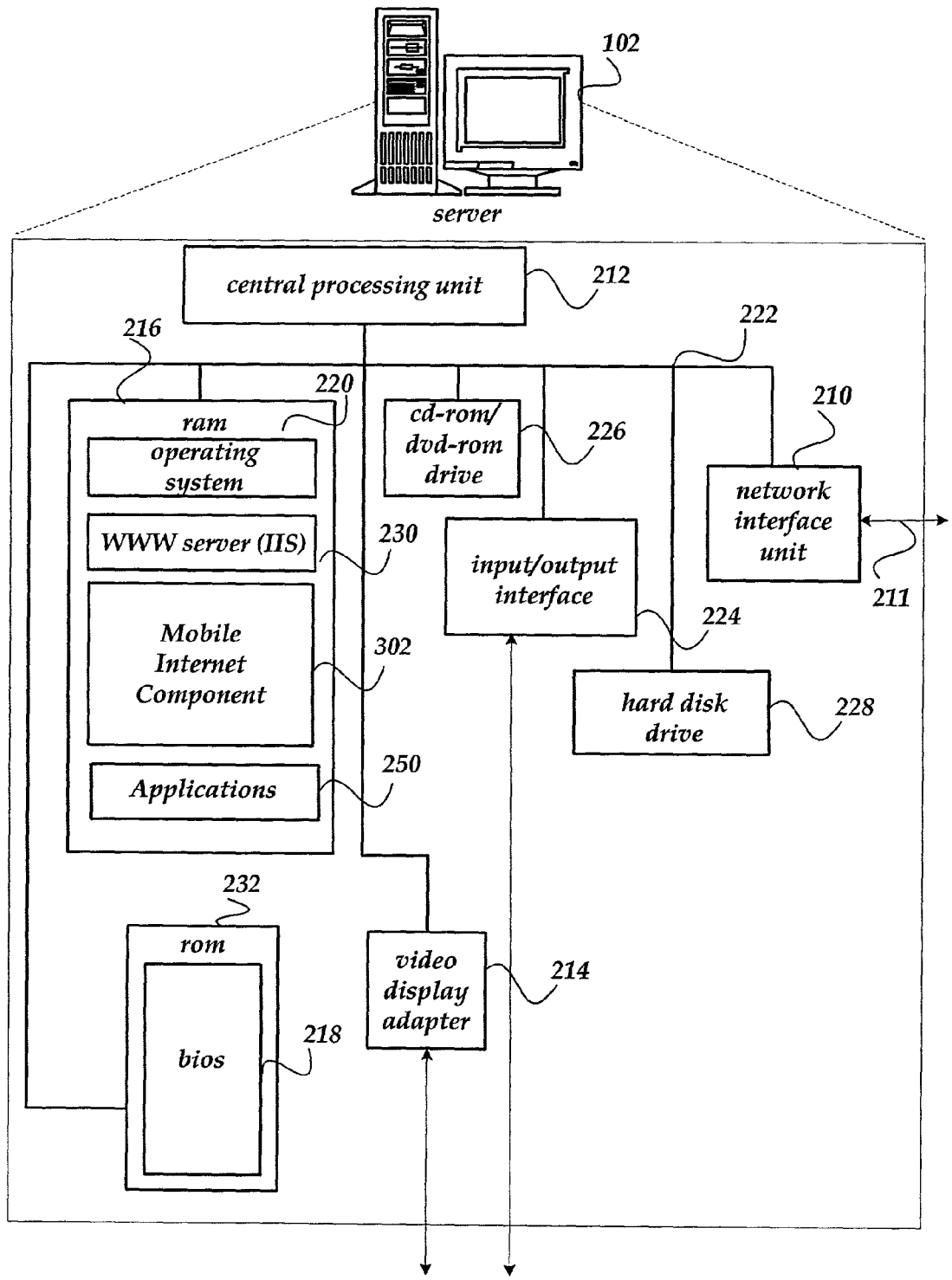
FIG. 2 shows an exemplary server computer that illustrates an operational environment for implementing the invention.

Server 102 is an example of a computing device, and is described in more detail in conjunction with FIG. 2. Server 102 stores, retrieves, and executes applications and/or objects in response to requests for information from mobile devices $116_{A-C}$. Server 102 executes mobile Internet component 302 in generating a device-specific response, such as HTTP response 121, that is transmitted through network 110 to requesting mobile devices $116_{A-C}$. Server 102 may also contain other application programs and components and may be used for a variety of purposes related or unrelated to the present invention.

Software development environment 103 provides a software developer the tools for developing server-based applications, such as server-based application 107, for server 102. Software development environment 103 may be as simple as a text editor used with a file transport protocol (FTP) application for transmitting and receiving programs to and from server 102, or it may include a suite of software development tools such as one or more compilers, debuggers, source code control applications, and team development tools, for example. Such software development tools typically make the software applications easier to develop, debug, and maintain.

Mobile Internet component 302 provides device identification data regarding the capabilities of the target device, such as mobile devices $116_{A-C}$. Identification data may be extracted from the HTTP request 120 or may be supplied by a local application. Mobile Internet component 302 utilizes server objects 106 and page file 108 created by a software development environment 103 to build the server-based application 107 and provide optimized content, according to one embodiment of the invention. Mobile Internet component 302 executes processes based on the capabilities of a target device that transform pages, forms, controls, and the like into content suitable for viewing on mobile devices $116_{A-C}$.

The server-based application 107, such as may be created by the software development environment 103, typically includes pages (e.g., page file 108) and other server objects 106, such as forms and active controls. The pages and server objects operate in cooperation to execute as an application on the server 102 and provide feedback and an interface to the target device over the network 110.

Server objects 106 include active controls, forms, and other objects (collectively referred to sometimes as "controls") for performing specialized tasks on behalf of the server-based application 107, such as displaying information to and receiving input from users. Controls encapsulate data that dictates how a control should be rendered for use by a mobile device. Controls are employed to display text and images on a mobile device $116_{A-C}$. A control may be used, for example, for collecting address information. The control may display address fields, prompt a user for address and name information, and validate inputted information. Other examples of server objects 106 may be a radio button control for receiving a selection, a free text control for receiving textual input, or an OK or CANCEL button. Another type of server object is a form control. Form controls may be considered as container controls with no visible representation, employed to call render methods of each of the controls contained in the form. Although controls like Form may not have a visible representation, they may (and often do) emit their own markup.

Importantly, each server object 106 has properties that affect how the server object 106 is displayed on a target device $116_{A\text{-}C}$. For instance, a free text control will likely have a property that defines the font size of the text displayed by the control. Likewise, a button control may have a property that defines the text displayed within the button. It will be appreciated that different mobile devices may have different display characteristics, which may impact how the server objects 106 should be rendered on those different devices. For instance, a cellular phone is likely to have a smaller display screen than a handheld personal computer.

The page file 108 includes information, such as a set of tags that correspond to server controls that govern the information that is presented to the target device. More particularly, the page file 108 includes many instructions that define which server objects 106 are used when rendering the response to the incoming request 120. In addition, and in accordance with the invention, the page file 108 includes additional declarative statements that may set the properties of those server objects 106 in accordance with the particular type of mobile device that issued the request. For instance, the page file 108 may include the following sample pseudo-code to identify which server objects 106 are used to construct the web page being requested, and to alter properties of those server objects 106 based on the type of target device:

```
<mobile:Image runat=server id="image1" ImageUrl="myimage.gif">
 <DeviceSpecific>
    <Choice Device="IsBlackAndWhite" ImageUrl="myimage_bw.gif"/>
    <Choice Device="IsGrayscale" ImageUrl="myimage_gs.gif"/>
    <Choice Text="My Image"/>
 </DeviceSpecific>
</mobile:Image>
```

In the above pseudo-code, the statement "mobile:Image" identifies the particular server object as an Image control, which is used to display a particular image on the target device. The statement "runat=server" indicates that the control will execute at the server 102. The statement "ImageUrl='myimage.gif'" indicates that an ImageUrl property of the Image control is set to "myimage.gif" (the particular image to be displayed). In accordance with the invention, a DeviceSpecific tag is included within the Image tag to indicate that properties of the Image control may be overridden when the page is compiled by the mobile Internet component 302. In the above example, two Choice statements alternatively override the "ImageUrl" property based on whether the target device supports grayscale images or only black and white images. The "Device=" condition specifies a filter against which the target devices are evaluated. Another Choice statement sets the "Text" property of the control to "My Image" independent of the type of target device. Note that a Choice statement without a Device= condition operates as a choice that matches any device (essentially the default choice).

In short, the server-based application 107 includes at least one page file 108 that identifies one or more server objects 106. The page file 108 describes the particular layout and interaction of the server objects 106 in such a way that a page of information may be transmitted to a target device. When designing the page file 108, a developer may use the inventive DeviceSpecific construct, introduced above and detailed below, so that certain properties of the specified controls may be altered based on the particular type of target device. Details of this operation are provided below.

Illustrative Server Environment

FIG. 2 shows an exemplary server computer that illustrates an operational environment for implementing the invention. FIG. 2 includes a server 102 as in FIG. 1. Server 102 includes a central processing unit 212, a video display adapter 214, an input/output interface 224, a network interface unit 210, and a mass memory, all in communication with each other via a system bus 222. The mass memory generally includes RAM 216, ROM 232, and one or more permanent mass storage devices, such as hard disk drive 228, optical drive 226 and optionally a tape drive, and/or floppy disk drives (not shown). The mass memory stores an operating system 220 for controlling the operation of server 102. Basic input/output system ("BIOS") 218 is provided for controlling the low-level operation of server 102.

Mass memory also stores WWW server 230 and the mobile Internet component 302. WWW server 230 is a web server application that hosts network connections between users of a network and the server 102. Mobile Internet component 302 and WWW server 230 include computer executable instructions which, when executed, generate displays and perform the logical functions. Mass memory may also include additional application programs 250.

As illustrated in FIG. 2, server 102 is operative to communicate with the Internet, or some other communications network, via network interface unit 210, which is constructed for use with various communication protocols including the TCP/IP protocol. A bidirectional communication 211 to network interface unit 210 is illustrated in FIG. 2. Server 102 may optionally include an SMTP handler application for transmitting and receiving e-mail, an HTTP handler application for receiving and handing HTTP requests, and an HTTPS handler application for handling secure connections. An HTTPS handler application may initiate communication with an external application in a secure fashion.

When a device such as mobile device $116_A$, shown in FIG. 1, requests display content from server 102, the request is routed to the WWW server 230. When the request is for server pages, the WWW server 230 forwards the request to mobile Internet component 302.

Figure 3:
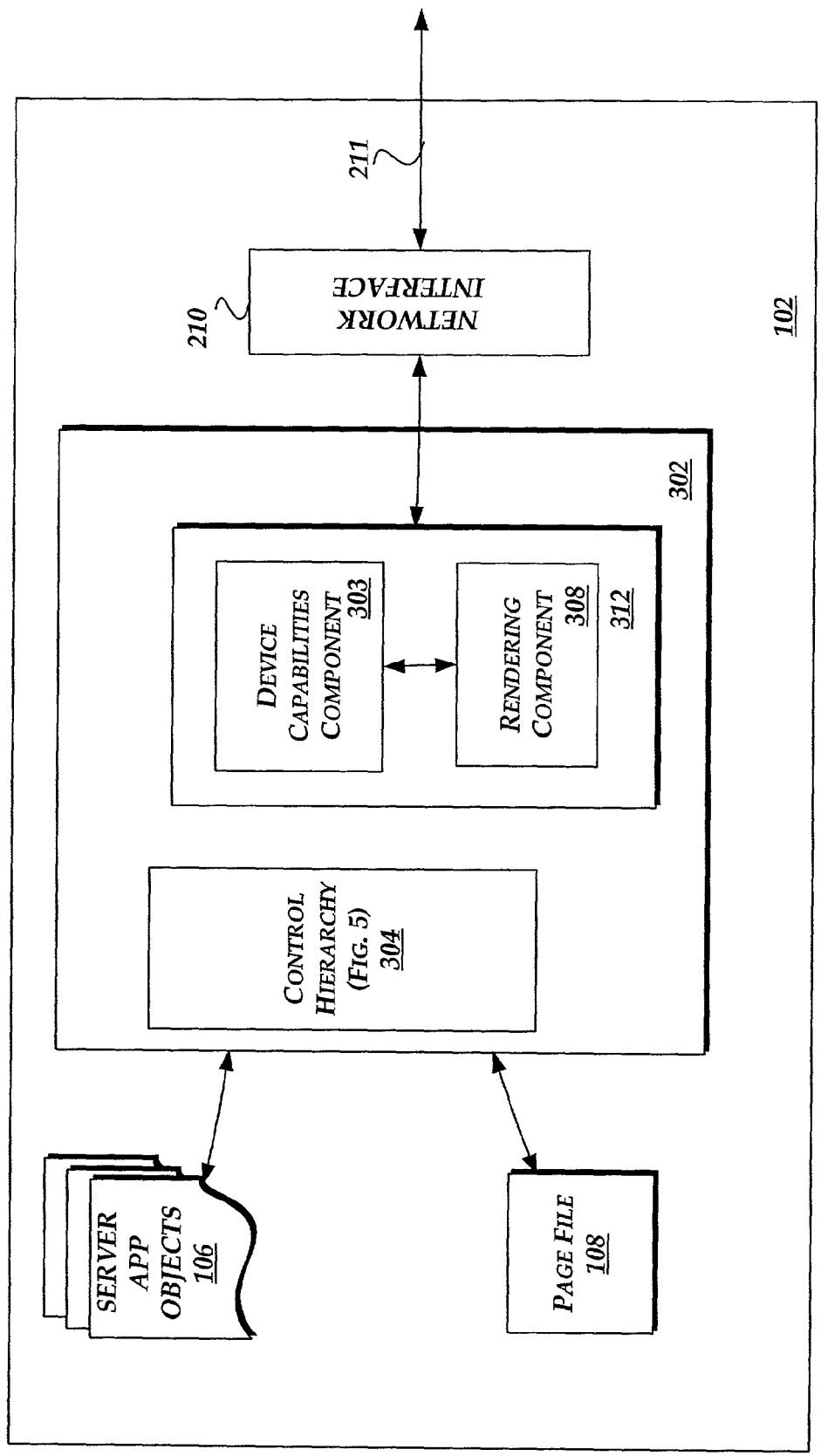
FIG. 3 shows a functional block diagram of server components in an illustrative environment for applying a declarative construct for device-specific content rendering.

FIG. 3 shows a functional block diagram of server components in an illustrative environment for applying a declarative construct for device-specific content rendering. FIG. 3 shows a server 102, as in FIG. 1, including mobile Internet component 302, page file 108, server objects 106, network interface 210, and bidirectional communication 211. Mobile Internet component 302 further includes a mobile runtime process 312 and a control hierarchy 304. Control hierarchy 304 is described below in greater detail in conjunction with FIG. 4. Briefly described, the control hierarchy 304 is a working copy or class of a compiled version of the server objects 106 implicated by the requested page file 108.

Mobile runtime process 312 receives requests, responses, and/or information from network interface 210. In essence, the mobile runtime process 312, in response to a request for a particular page, builds the control hierarchy 304 for a target device from the requested page (e.g., page file 108) in conjunction with the server objects 106. To facilitate that end, the mobile runtime process 312 includes device capabilities component 303 and rendering component 308.

The device capabilities component 303 is programmed to receive information from an incoming page request (HTTP request 120 in FIG. 1) and identify the particular type of target device. Different devices may have different capabilities as discussed in conjunction with FIG. 1. Device capabilities component 104 may include a database of "known" devices, it may query a device in real-time for capabilities, or it may determine capabilities from additional information sent by the device. For example, a device may include information about screen size within a header in its request sent to the server. Device capabilities component 104 may determine that the device capabilities are unknown. In such a case, device capabilities component 104 may send a default set of capabilities, an error, or some other message so indicating.

The rendering component 308 is used to create actual response content for transmission to the target device. In other words, once the server-based application has been compiled and content for the requested page has been constructed, the actual content returned is prepared by the rendering component 308 for transmission to the target device.

Network interface 210 transmits and receives bidirectional communication 211. Such communication may be transmitted and received using protocols including hypertext transport protocol (HTTP), transmission control protocol/Internet protocol (TCP/IP), ftp, email, direct file transfer, combinations thereof, and the like. In essence, any transmission protocol capable for transmitting information over a network may be used in conjunction with network interface 210 to send information to and receive information from devices.

Some embodiments of mobile Internet component 302, its subcomponents, and other components have been described above. In light of this disclosure, it will be understood that components and interactions of the components within server 102 could be changed, added, or removed without departing from the spirit and scope of this invention.

Figure 4:
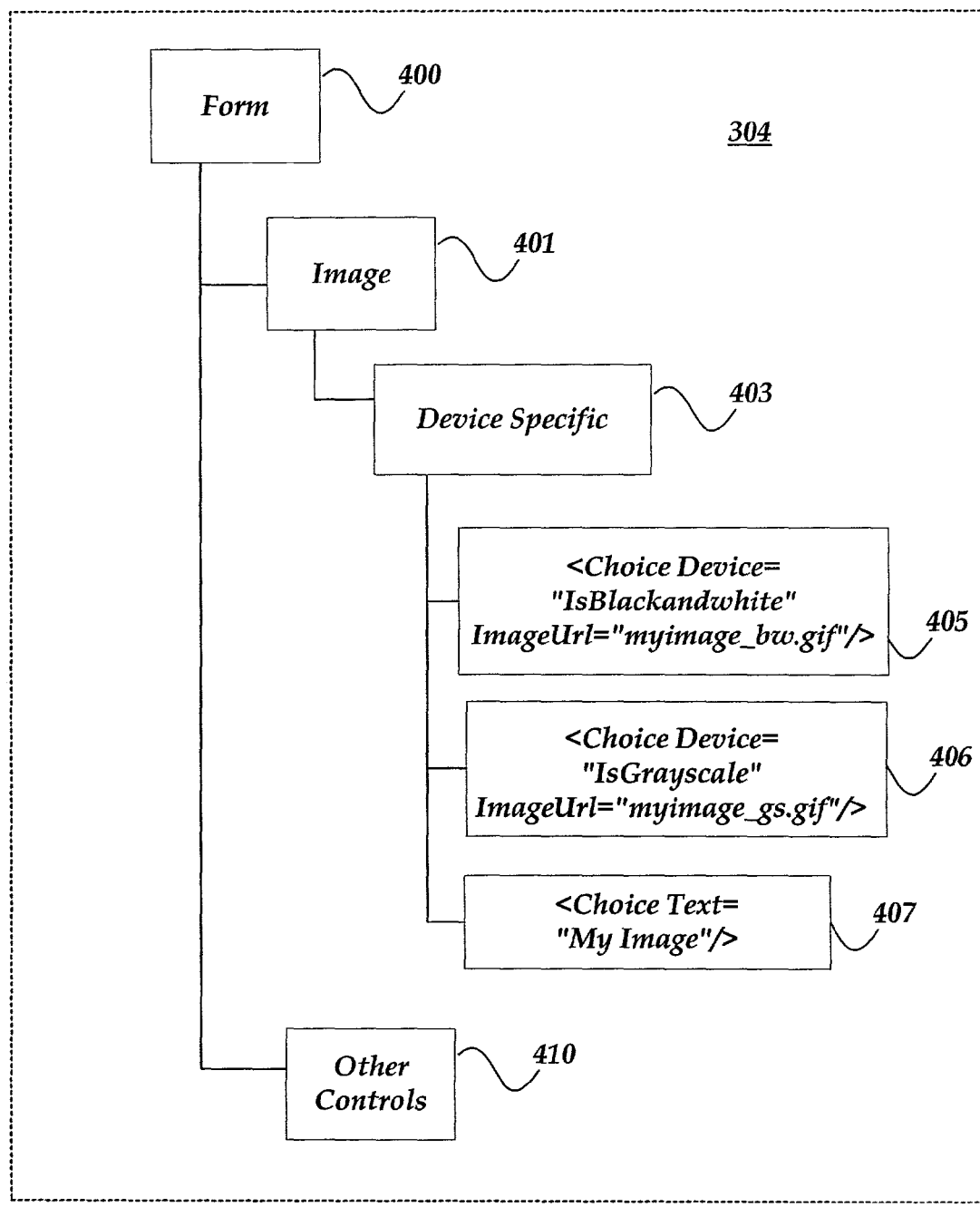
FIG. 4 is a functional diagram illustrating an illustrative control hierarchy to override control properties in an example of the invention.

FIG. 4 is a functional diagram illustrating an illustrative control hierarchy to override control properties in an example of the invention. A control hierarchy, such as control hierarchy 304, may be used in the process of compiling a page file 108 into a server-based application 107. The control hierarchy 304 may be thought of as an object class that defines the executable portion of the server-based application 107. A typical control hierarchy 304 includes an object hierarchy or tree structure including the controls or server objects identified by the requested page file. The control hierarchy may include parent controls, such as Image control 401, and one or more child controls, such as DeviceSpecific control 403, thus, providing a hierarchical structure. Control hierarchy 304 may also include other controls 410.

In one embodiment, the control hierarchy 304 is created based on a declarative construct used when developing the page file 108. The declarative construct was introduced above in conjunction with FIG. 1, and generally takes the form of the following markup tag:

```
<DeviceSpecific>
    <Choice Device="_____" Property=argument>
    <Choice Device="_____" Property=argument>
    <Choice Device="_____" Property=argument>
</DeviceSpecific>
```

In this embodiment, the DeviceSpecific tag is nested within a tag that identifies a particular control. The existence of the DeviceSpecific tag indicates to the process compiling the requested page that the particular control has properties that may be overridden based on different types of devices. The Choice tag includes a condition that identifies the particular type of device (e.g., the Device="_____" statement) and the value to apply to a particular property if that condition is true (e.g., the "Property=argument" statement).

In operation, the compiling process (e.g., mobile runtime process 312) may walk the requested page file and create an object within the control hierarchy 304 for each identified control. A nested tag may indicate to the compiling process to create a child object. Thus, in accordance with the disclosed embodiment, the DeviceSpecific tag causes a child object to be created in the control hierarchy 304 under the particular control within which the DeviceSpecific tag exists. It is possible for a control to have multiple DeviceSpecific tags where each DeviceSpecific tag would be applied to the control independently. Each set of property overrides may be based on different device decisions than another set, further easing management of control property overrides. To illustrate the point more clearly, consider once again the sample pseudo-code introduced above in conjunction with the page file 108 of FIG. 1:

```
<mobile:Image runat=server id="image1" ImageUrl="myimage.gif">
    <DeviceSpecific>
        <Choice Device="IsBlackAndWhite"ImageUrl="myimage_bw.gif"/>
        <Choice Device="IsGrayscale" Image Url="myimage_gs.gif"/>
        <Choice Text="My Image"/>
    </DeviceSpecific>
</mobile:Image>
```

In this case, the control hierarchy 304 includes an Image control 401, which has a DeviceSpecific child control 403. In addition, the DeviceSpecific control 403 includes child objects 406-407 that each represents one of the alternative Choice tags above. Thus, the result of interpreting the page file 108 and building the control hierarchy 304 is a structure that identifies each of the controls (including their properties) that are used to create the display to be returned to the target device. Where appropriate, objects within the control hierarchy 304 include DeviceSpecific children that, when implemented, override certain properties of the parent control. The certain properties and their override values are individually stored within Choice objects, which are children of the DeviceSpecific object.

Operation of the Described Embodiments

Figure 5:
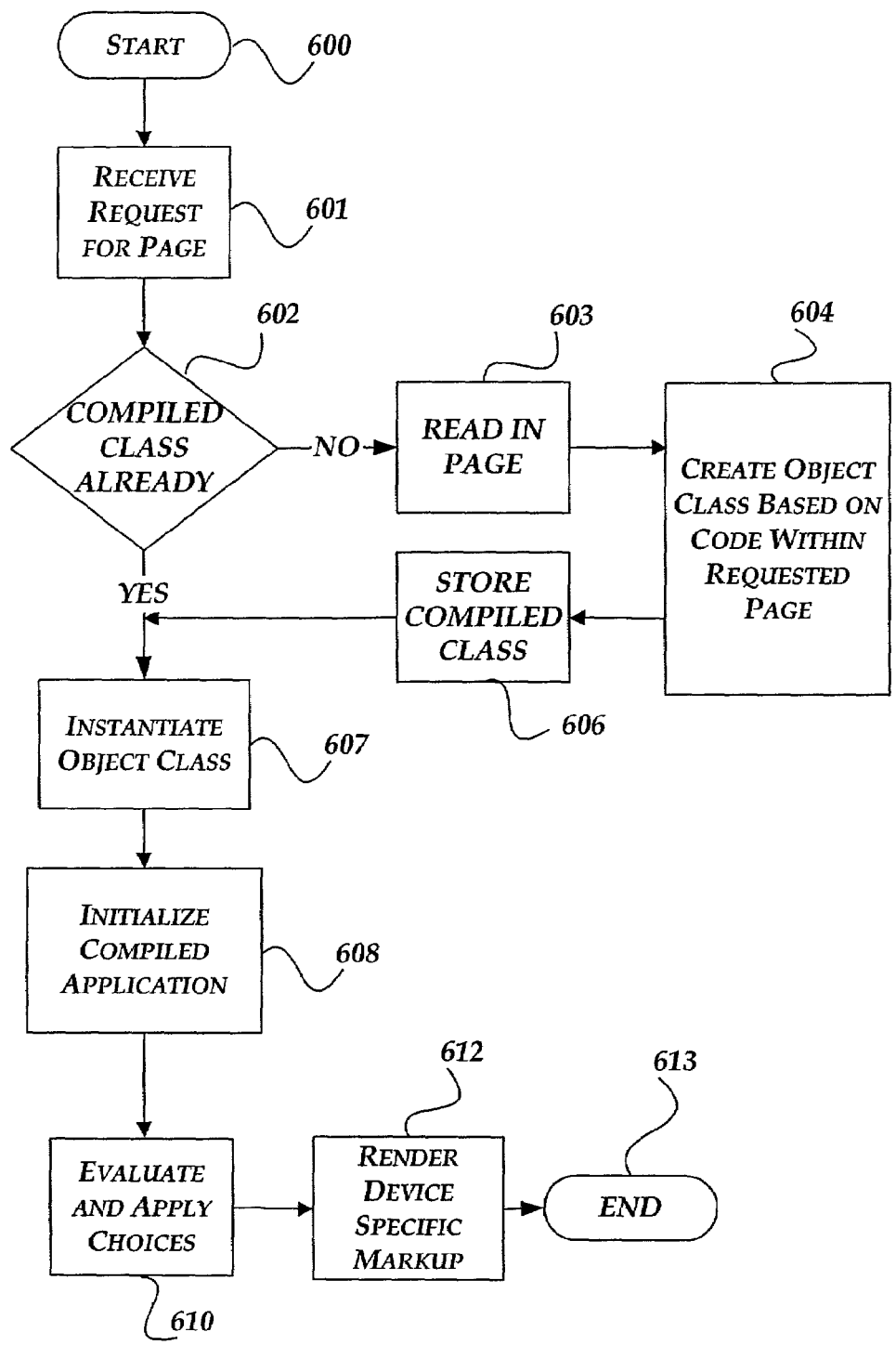
FIG. 5 is a flow diagram illustrating a process for declaratively altering properties of server objects used in a server-based application, in accordance with an embodiment of the invention.

FIG. 5 is a flow diagram illustrating a process for declaratively altering properties of server objects used in a server-based application, in accordance with an embodiment of the invention. The process 600 begins at step 601 where a request is received from a target device for a page file. The request may be an HTTP request or other equivalent request for information over a network. At step 602, a determination is made whether a compiled version of the requested page already exists for the target device. Referring to the system described above, the device capabilities component 303 may be used to determine the particular type of target device, and the mobile runtime process 312 may then query whether a class exists to implement the requested page for that particular type of device.

If the determination at step 602 is negative, then, at step 603, the requested page is read. In accordance with this embodiment, the page has been developed using the Device-Specific construct described above for those controls or server objects for which device-specific properties may be appropriate. At step 604, a run-time process, such as mobile runtime process 312, compiles and builds an object class that describes the particular controls described within the requested page. In accordance with the invention, the object class may be a control hierarchy, such as that described above in conjunction with FIG. 4, that includes objects for each control described within the requested page. Controls including DeviceSpecific information additionally include child controls that provide alternative values for particular properties as may be set for different types of devices. In one particular embodiment, a "Choice" object contains a "property bag" that can hold an arbitrary set of properties. The "Choice" object is added to a "DeviceSpecific" object, which maintains an ordered set of "Choices." The "DeviceSpecific" object is added to the control, which maintains a reference to it. At step 606, the compiled class is stored.

When the compiled class is stored, or if the determination at step 602 was yes, then, at step 607, the object class is instantiated to service the incoming page request. Step 607 occurs for each new request for a page from a device matching the target device.

At step 608, execution of the requested page is begun. During page initialization, each control in the corresponding control hierarchy has an initialize method called on it. The initialize method determines if a "DeviceSpecific" object has been added to the control. If so, the initialize method requests the "DeviceSpecific" object to apply applicable property overrides for the control. The "DeviceSpecific" object goes through each Choice object in order, and requests the Choice object to evaluate itself against the device capabilities information (supplied by device capabilities component 303).

At step 610, the Choice objects are evaluated and, where appropriate, modify the corresponding properties of the parent control. The "Choice" object may use a "Device" property to evaluate itself. If a Choice object evaluates successfully, it then applies the corresponding property overrides. The Choice object would iterate over each property in its particular "property bag" and set the corresponding properties on the parent control accordingly. For instance, referring briefly to the control hierarchy 304 illustrated in FIG. 4.

At step 612, the device-specific page markup is rendered by a rendering subcomponent, such as rendering component 308 (FIG. 3), and transmitted to the target device. For instance, once the server-based application has been initialized (as done at steps 608-610), the controls that form the application have been modified in accordance with the particular target device. Thus, when each control performs its respective portion of the execution of the application, the output from the control will be tailored for the type of target device. The markup may then be returned to the target device in any conventional manner. The process 600 terminates at step 613.

In another embodiment, alternative code may be created to set the properties of the containing control directly by evaluating a series of conditions rather than creating child objects associated with each of the DeviceSpecific tags and Choice tags described in the page file.

For instance, at step 604 above, an object class may be constructed that includes a conditional construct representing each of the choices described in the page. One example of such alternative code may take the form:

```
Sub ApplyImageOverrides(image)
    If (Device = "IsBlackAndWhite") Then
        image.ImageUrl = "myimage_bw.gif"
    Else If (Device="IsGrayscale") Then
        image.ImageUrl = "myimage_gs.gif"
    Else
        image.Text = "My Image"
    End If
End Sub
``` and that code may be included in the object class generated when the page file is compiled. In this way, when the compiled page is instantiated, at step 607 above, the alternative code is executed, which evaluates the device and sets device-specific properties appropriately.

Each block of the flowchart illustrations, and combinations of blocks in the flowchart illustrations, can be implemented by computer program instructions. These program instructions may be provided to a processor to produce a machine, such that the instructions, which execute on the processor, create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A computer-implemented method for providing content to a target device, the method comprising:
    identifying a device class associated with the target device, the target device including a user interface with display properties, the device class associated with the display properties;
    if the compiled version of the page does not exist, compiling an application based on a page file including information describing the content to be returned to the target device, the information including statements of device class-specific user interface display properties for the content to be returned, the device class-specific user interface display properties being based on the device class of the target device;
    replacing at least one default property with the device class-specific user interface display properties; and
    rendering the content based on the device class-specific user interface display properties of the content within the compiled application, wherein the content is custom formatted for the target device user interface.

2. The computer-implemented method of claim 1, wherein the device class is included within an instruction to transmit the content to the target device.

3. The computer-implemented method of claim 2, wherein the instruction comprises a request generated by the target device.

4. The computer-implemented method of claim 3, wherein the request comprises an HTTP request for the page file.

5. The computer-implemented method of claim 3, wherein the instruction further includes an identification of the page file.

6. The computer-implemented method of claim 1, wherein the information describing the content includes tags within the page file that identify at least one server object that is programmed to create the content.

7. The computer-implemented method of claim 1, wherein the statements that provide the choices include a declarative statement identifying at least one choice for at least one user interface display property of a server object corresponding to the declarative statement.

8. The computer-implemented method of claim 7, wherein the at least one choice applies if a pre-determined condition is satisfied.

9. The computer-implemented method of claim 1, wherein compiling the application further comprises generating code that describes a control hierarchy of server objects that are programmed to create the content.

10. The computer-implemented method of claim 9, wherein evaluating the choices comprises instantiating the control hierarchy based on the generated code.

11. The computer-implemented method of claim 9, wherein a server object includes a user interface display property and the control hierarchy further includes at least one choice for that user interface display property, the choice including a filter against which the device class of the target device is evaluated to determine whether to apply that choice to the user interface display property of the content.

12. The method of claim 9, wherein each user interface display property corresponds to an input parameter for an associated server object in the control hierarchy of server objects that create the content.

13. The computer-implemented method of claim 1, wherein evaluating the choices includes comparing the device class of target device against a filter to determine whether to apply the existing value to the user interface display property.

14. The method of claim 1, wherein a first user interface display property of the content to be returned identifies a graphic element and wherein the choice for the first user interface display property is a choice of values corresponding to different graphics, each graphic being suitable for display on a different, associated device class.

15. The method of claim 1, wherein a second user interface display property of the content to be returned identifies a font size and wherein the choice for the second user interface display property is a choice of values corresponding to different font sizes based on the device class, each value corresponding to a font size associated with a different device class.

16. The method of claim 1, wherein a third user interface display property of the content to be returned identifies a user control element and wherein the choice for the third user interface display property is a choice of different user controls, each user control being suitable for display on a different, associated device class.

17. A computer-readable storage medium having computer executable instructions, comprising:
   receiving an instruction to provide a page to a target device, wherein data is provided in the instruction identifying the target device, the target device including a user interface with display properties;
   determining whether a compiled version of the page exists for the target device;
   if the compiled version of the page does not exist, compiling the page to create a class based on a page file including values for device-specific content, the class associated with the display properties;
   instantiating an instance of the class including a plurality of controls, at least one of the controls having a user interface display property and a set of values for that user interface display property based on the target device in the page file, wherein each value is associated with different device-specific content to be displayed by the control;
   choosing one of the values in the page file based on the target device identified in the instruction;
   applying the value associated with the choice to the at least one control; and
   rendering device-specific content to the target device.

18. The computer-readable medium of claim 17, wherein the instruction comprises a request generated by the target device.

19. The computer-readable medium of claim 18, wherein the instruction comprises an HTTP request for the page.

20. The computer-readable medium of claim 18, wherein the instruction further includes an identification of the page.

21. The computer-readable medium of claim 17, wherein the page includes tags that identify at least one server object that is programmed to create the content, and at least one device condition and an associated value for a user interface display property of the at least one server object.

22. The computer-readable medium of claim 21, wherein the tags include a declarative statement identifying the choice for the property of the control.

23. The computer-readable medium of claim 22, wherein the at least one choice applies if a pre-determined condition is satisfied.

24. The computer-readable medium of claim 17, wherein compiling the application further comprises generating code that describes a control hierarchy of server objects that are programmed to create the content.

25. The computer-readable medium of claim 17, wherein the choice includes a filter against which the target device is evaluated to determine whether to apply that choice to the user interface display property.

* * * * *

UNITED STATES PATENT AND TRADEMARK OFFICE
CERTIFICATE OF CORRECTION

| | | |
|---|---|---|
| PATENT NO. | : 7,428,725 B2 | Page 1 of 1 |
| APPLICATION NO. | : 09/989562 | |
| DATED | : September 23, 2008 | |
| INVENTOR(S) | : Shanku S. Niyogi et al. | |

It is certified that error appears in the above-identified patent and that said Letters Patent is hereby corrected as shown below:

Title page, in field (54), under "Title" column 1, line 1, delete "DEVICES" and insert -- DEVICE --, therefor.

In column 1, line 1, delete "DEVICES" and insert -- DEVICE --, therefor.

Signed and Sealed this
Twenty-sixth Day of April, 2011

David J. Kappos
*Director of the United States Patent and Trademark Office*